United States Patent [19] … [11] 4,186,716
Baker et al. … [45] Feb. 5, 1980

[54] PORTABLE CAMPFIRE GRILL

[76] Inventors: David E. Baker; Kenneth D. Baker, both of 18880 Walnut Dr., Castro Valley, Calif. 94546

[21] Appl. No.: 683,406

[22] Filed: May 5, 1976

[51] Int. Cl.² ............................................. A47J 37/07
[52] U.S. Cl. ....................................... 126/29; 126/9 R; 248/165
[58] Field of Search ................ 126/29, 30, 9; 248/150, 248/165, 174, 523, 524; 211/189; 108/153

[56] References Cited

U.S. PATENT DOCUMENTS

| | | | |
|---|---|---|---|
| 1,273,840 | 7/1918 | Fassett | 126/9 B |
| 2,022,291 | 11/1935 | Lehman | 248/165 |
| 2,575,188 | 11/1951 | Schell | 126/9 B |
| 2,592,561 | 4/1952 | Greenwood | 248/524 |
| 3,341,162 | 9/1967 | Ruchlis | 248/165 |
| 3,636,938 | 1/1972 | Faltersack | 126/30 |

Primary Examiner—Lloyd L. King
Assistant Examiner—Harold Joyce
Attorney, Agent, or Firm—Thomas H. Olson

[57] ABSTRACT

A portable campfire grill employing three identical elongate members constructed of steel or like heat resistant material. Each of the elongate members has a pair of slots, one slot being formed adjacent each end and the respective slots being oriented in opposite directions. The slots have a depth half the width of the member so that when the elongate members are engaged by interengagement at the slots, the opposite surfaces of the elongate members are in coplanar relation thereby forming a triangular shaped grill structure having a flat surface. The slots have a dimension in a direction longitudinally of the members such that the members must be stressed to effect such interengagement so that the triangular structure formed by assembling the three members is retained in assembled, operative condition.

1 Claim, 4 Drawing Figures

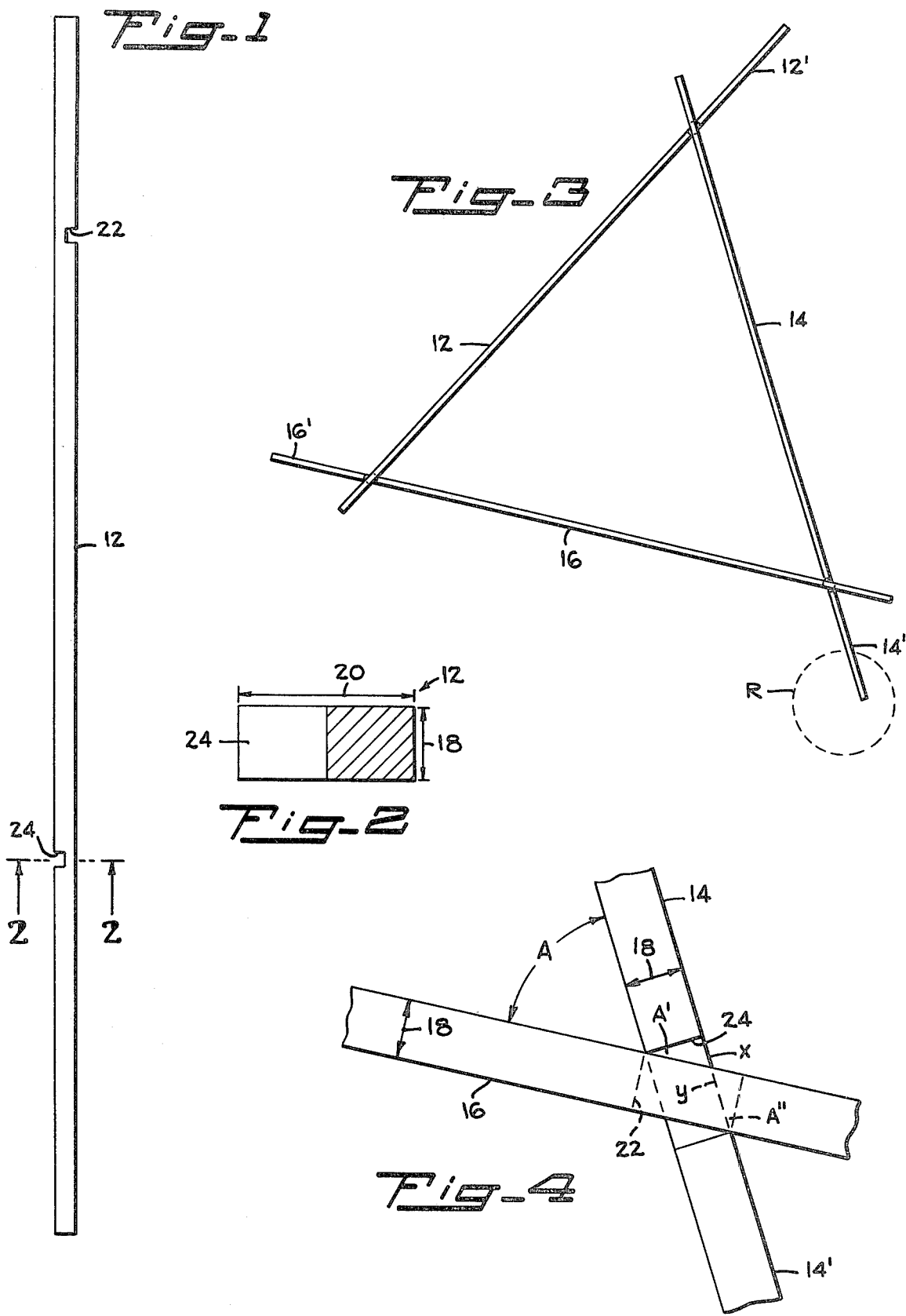

PORTABLE CAMPFIRE GRILL

BACKGROUND OF THE INVENTION

1. Field of the Invention

This invention relates to a portable campfire grill and more particularly to a portable campfire grill that is capable of disassembly so as to afford transportation thereof in a compact form such as is desirable in backpacking.

2. Description of the Prior Art

As far as is known, backpackers have either transported grates formed of a plurality of cross wires supported in a rigid configuration or have relied on hooks or the like to support pots over a campfire. A grate is a relatively large article and difficult to pack in a backpack of appropriate size. Campfire cooking without a grate of any kind is extremely inconvenient and difficult.

SUMMARY OF THE INVENTION

In its preferred form the present invention is embodied in three identical elongate steel members having a length of approximately 20 inches. The members have a generally rectangular cross-section and have oppositely facing notches formed adjacent the respective ends thereof. The notches are so proportioned with respect to the thickness of the elongate members that by interengaging the members adjacent the notches a triangular grill is formed. The notches are proportioned so that in order to interengage the members it is necessary to stress the members slightly wherefore a frictional force between the contacting portions of the respective interengaged members retains the grill in an assembled condition.

An object of the invention is to provide a simple campfire grill capable of disassembly so as to facilitate transportation of the grill in a backpack. This object is achieved by providing three identical elongate members which occupy but little space in a backpack and which through the above mentioned slot arrangement and configuration can be assembled into a triangular grill that is suitable for being supported on rocks or the like disposed around a campfire.

Another object of the present invention is to provide such a campfire grill wherein the grill will remain in an assembled condition until purposely disassembled. This object is achieved by so proportioning the slots that the members must be stressed in order to assemble them into the triangular configuration. Achievement of the object stated above permits the grill to be placed over a campfire or removed from a campfire with one hand and with great facility.

Still another object of the invention is to provide a campfire grill of the type described above in which all members, when in an assembled condition, are in coplanar relationship. Achievement of this object is important in that pots can be supported at the intersections or apices of the respective members and is accomplished because the above mentioned slot are formed with a depth equal to one-half of the width of the elongate members so that when the members are interengaged with one another at the slots the advantageous coplanar relationship is achieved.

Yet another object is to provide a portable campfire grill that is extremely stable when in use. This object is achieved by forming the grill in a triangular shape which can be supported over a campfire by strategically placed rocks or the like.

The foregoing together with other objects, features and advantages will be more apparent after referring to the following specification and the accompanying drawing.

BRIEF DESCRIPTION OF THE DRAWING

FIG. 1 is a side view of one longitudinal member according to the invention.

FIG. 2 is a cross sectional view at enlarged scale taken on a plane designated by line 2—2 of FIG. 1.

FIG. 3 is a plan view of a grill according to the invention in assembled condition.

FIG. 4 is a fragmentary view at enlarged scale showing one of the intersections of the assembled grill structure of FIG. 3.

DETAILED DESCRIPTION OF THE PREFERRED EMBODIMENT

Referring more particularly to the drawing, reference numerals 12, 14 and 16 indicate substantially identical elongate members formed according to the invention. Because the members are substantially identical, a detailed description of one, having reference to FIGS. 1 and 2, will suffice as a description of all. Elongate member 12, as can be seen in FIG. 2, is of rectangular cross-section having a thickness dimension 18 and a width dimension 20. At spaced apart locations along the elongate member 12, preferably adjacent opposite ends thereof, are slots 22 and 24. As can be seen in FIG. 1, slots 22 and 24 extend to opposite edges of the member for a purpose which will be made clear subsequently. The slots have a depth, as seen in FIG. 2, equal to one-half the width dimension 20 of the elongate member. When one elongate member is engaged with another by interengaging notch 22 of one member with notch 24 of the other member, the edges of the respective members are coplanar because of the fact that the depth of both slots 22 and 24 is equal to one-half the width of the members.

The axial extent of each of the slots is established so that it is necessary slightly to stress the respective elongate members when they are assembled, thereby causing a frictional force between the interengaged members which retains the members into the triangular configuration shown in FIG. 3. The preferred axial extent of the slots can be appreciated by reference to FIG. 4. FIG. 4, although it exemplifies the case where each of three members 12, 14 and 16 is identical, has more general application because the same factors apply where the elongate members are not identical and are employed to form a non-equilateral triangle. The longitudinal dimension of the slot must be greater than the thickness 18 of the elongate member to afford introduction of the member into the slot. The maximum dimension is determined by certain trigonometric relationships and by the elasticity of the material of which the elongate members are constructed. The theoretical maximum longitudinal dimension of slot 24 is shown in FIG. 4 for an included angle A that approaches 60° as would be the case in an equilateral triangular configuration. The longitudinal dimension can be considered as having two components, one designated by the solid line x and the other designated by the broken line y. The longitudinal dimension of the slot is $x+y$. If A is 60° then angle A' will also be 60° wherefore the following equation for x can be derived:

$$x = T/\tan 60° = T/\sqrt{3},$$

wherein T is thickness dimension 18. With respect to the distance y, the angle A' is assumed to be 60° wherefore the distance of y is represented by the following equation:

$$y = T/\cos 60° = T/\sqrt{3/2}.$$

Accordingly the longitudinal dimension of the slot $= x + y = T/\sqrt{3} + T\sqrt{3/2} = \sqrt{3} \times T = 1.7321$ T.

A slot having the above longitudinal dimension permits interengagement of two of the elongate members in an equilateral configuration without stressing the material of which the elongate members are formed. Thus, in order to insure a degree of stress in the members, it is essential that the longitudinal dimension of the slots be less than the quantity $\sqrt{3} \times T$ to assure that the members will be stressed when in the assembled condition so as to assure a frictional force that maintains the elongate members in an assembled condition. The specific longitudinal dimension of the slots between a minimum, equal to the width of the members, and a maximum, equal to less than $\sqrt{3}$ T, will be determined by the elasticity of the material of which the elongate members are constructed, because it is essential that the longitudinal dimension of the slot be such that the elastic limit of the material is not exceeded when the members are in an assembled condition. In one structure designed according to the present invention elongate members 12, 14 and 16 are formed of steel stock having a length of about 20 inches, a thickness of ⅛ inch and a width of ⅜ inch. In such design slots 22 and 24 of the respective members have a longitudinal extent of 3/16 inch and a depth of 3/16 inch. Such exemplary structure, when assembled, defines an interior angle at the apices of the triangular configuration equal to approximately 62°, indicating that each of the elongate members intermediate the slots is slightly bowed to a degree well within the elastic limit of the material.

It will be noted from FIGS. 1 and 3 that slots 22 and 24 are not uniformly spaced from the respective ends of the elongate members of which they are a part. As seen in FIG. 3 such non-uniformity forms at each apex a relatively long leg designated respectively at 12', 14' and 16'. Such legs function to support the apices of the assembled structure, such as by means of a rock R at a point spaced from the apex or intersection of the respective corners of the structure. Of course this mode is possible only if slot 24 (the slot adjacent the long leg) faces upward at all corners. The function of the legs is to permit fire to exist under the respective corners or apices of the triangular configuration so as to support a pot at such corner above the fire and without interference with rock R or other means employed to space the grill above the fire. In the exemplary embodiment referred to above long legs 12', 14' and 16' each have a length of about 6 inches as compared to the distance between slot 22 and the end to which it is adjacent of about 3½ inches.

Thus it will be seen that the present invention provides a campfire grill that is highly portable in that it comprises three long thin members, but which can be quickly assembled and installed at a campsite. When placed over a fire the grill is rigid, a characteristic arising from its triangular construction and from the fact that the elongate members must be slightly stressed in order to effect and retain assembly of the grill.

The equilateral form, as described hereinabove and shown in the drawing, has the advantage of employing three identical members. It is within the invention, however, to provide three members of unequal length thereby forming a grill of isosceles or scalene shape.

Although one embodiment has been shown and described, it will be obvious that other adaptations and modifications can be made without departing from the true spirit and scope of the invention.

What is claimed is:

1. A portable campfire grill for supporting cooking pots on an open fire comprising a trinity of substantially identical straight linear elongate members constructed of substantially rigid heat resistant resilient material having an elastic limit, each said elongate member having a substantially uniform cross sectional shape throughout its length and a thickness dimension, two spaced apart portions of each said elongate member defining first and second oppositely opening slots extending substantially perpendicularly of the longitudinal axis of said member, each said slot having a dimension longitudinally of the respective elongate member greater than the thickness dimension and less than $\sqrt{3}$ times the thickness dimension so as to stress within the elastic limit the elongate members when assembled into a triangular configuration by interengaging the slots of respective said members, said slots having a depth approximately equal to ½ said width dimension so that when said members are interengaged with one another the exterior surfaces thereof are substantially coplanar, said first slot in each said member being spaced farther from the adjacent end than said second slot so that each said member has a relatively long leg portion outward of said first slot, so that with said first slot in an upward position said grill can be supported at three triangularly spaced locations which are outwardly remote from the apices of said triangular configuration.

* * * * *